United States Patent Office 3,275,708
Patented Sept. 27, 1966

3,275,708
PHENOLIC ADDUCTS OF DIPHENYLOXIDES OR BIPHENYLS, WITH EPOXY RESINS
Harold R. Bylsma, Midland, Mich., assignor to The Dow Chemical Company, Midland, Mich., a corporation of Delaware
No Drawing. Filed Oct. 2, 1961, Ser. No. 142,037
8 Claims. (Cl. 260—830)

The invention concerns a new resinous product comprising the reaction product of (A) a phenolic adduct of (1) a chloromethylated aromatic compound and (2) an hydroxylated aromatic compound and (B) an epoxy resin.

The new resinous product of the invention is a thermoset durable resin. It has excellent physical properties which render it especially suitable for a large number of uses requiring good tensile strength, flexibility, adhesion, dielectric, and resistance to chemical attack, weathering, and wear. It is especially adapted for use as an impregnating and laminating resin, e.g., for making glass cloth laminates. It is prepared without the need for an amine-type reactant or a dicarboxylic-type reactant curing agent such as is generally found necessary to cure or harden an epoxy resin.

The chloromethylated aromatic compound (1) employed to make the phenolic adduct may be represented by the formula

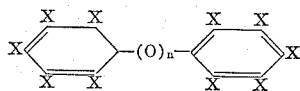

wherein $n$ is 0 to 1 and wherein at least one X is $CH_2Cl$ and the other X values are selected from the class consisting of H, $CH_2Cl$, Cl, Br, R, and OR wherein R is alkyl of 1 to 4 carbon atoms. Illustrative thereof are bis(chloromethyl)biphenyl and bis(chloromethylphenyl) oxides and halo, alkyl, alkoxy, and aryl substituted derivatives thereof.

Among the preferred chloromethylated aromatic compounds to employ are mono-, di-, tri-, or tetrachloromethyldiphenyl oxide or mixtures thereof. The mixtures are commonly used, the most typical of which are tabulated below. The abbreviation, CMDPO, is used sometimes hereinafter to indicate any chloromethyl-substituted diphenyl oxide. The meaning of the numbers: —28, —25, and —32 when appended to said abbreviation herein, are defined in the tabulation.

The hydroxylated aromatic compound employed to make said adduct may be represented by the following formula:

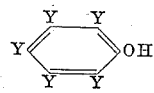

wherein Y is H, Cl, Br, alkyl, aryl, aralkyl, or hydroxyaryl, the alkyl groups containing from 1 to 10 carbon atoms. Illustrative thereof are the halophenols including orthochloro-, metachloro-, parachloro and trichlorophenols; the alkyl phenols wherein 1 to 5 alkyl groups are attached to the phenolic nucleus and includes the tertiary alkyl, e.g., para-tertiary-butyl-phenol; ortho-, meta-, and para-cresol, and the bisphenols, e.g., 4,4'-isopropylidenediphenol, 4,4'-methylenediphenol, and halo, alkyl, and aryl derivatives thereof.

To prepare the adduct, a chloromethylated aromatic compound and an hydroxylated aromatic compound, as above described, preferably in a molar excess of the hydroxylated compound, are admixed in a suitable reaction vessel, accompanied by stirring. Preferably the hydroxylated compound is first placed in the vessel, heated to between about 50° C. and 100° C., and the chloromethylated compound added thereto over a period of from about 5 to 120 minutes, while maintaining heat and mild agitation. Excess hydroxylated compound is then removed, as by vacuum distillation, e.g., at between 10 and 40 mm. of Hg pressure over a period of about an hour at between about 190° and 200° C. The product remaining is the desired phenolic adduct.

The following procedure is illustrative of the preparation of the phenolic adduct employing chloromethylated diphenyl oxide and p-tertiary-butylphenol as the beginning ingredients. The specific conditions and the materials and amounts thereof employed are exemplary and are not to be construed as limitations of the manner of preparing the adduct used in the preparation of the resinous composition of the invention.

A chloromethyldiphenyl oxide, which may vary in the percentage by weight thereof (depending on whether or not only one or both of the aryl nuclei contain 1, 2, 3, or 4, chloromethyl substituents, or one of the many possible mixtures thereof), is admixed with p-tertiary-butylphenol at about 100° C. After complete addition, the resulting reaction mixture is vacuum distilled at be-

| Typical Chloromethylated Diphenyl Oxides | Mole Percent [1] | | |
|---|---|---|---|
| | CMDPO-28 | CMDPO-25 | CMDPO-32 |
| ortho-Chloromethyl | 0.5 | 0.25 | None |
| para-Chloromethyl | 4.7 | 2.35 | 0.04 |
| ortho, para'-Dichloromethyl | 35.4 | 17.7 | 1.9 |
| para, para'-Dichloromethyl | 37.7 | 69.5 | 8.6 |
| Trichloromethyl [2] | 21.1 | 10.5 | 89.0 |
| Tetrachloromethyl [2] | 0.5 to 1.0 | 0.5 | None |

[1] Actual laboratory analysis and calculations are set out without attempt to correct for experimental error. It will be noted that the percentage compositions above total 99.9% to 100.4%, 100.8%, and 99.54%, respectively whereas it is clear that each should theoretically total 100%. Analysis of mixtures of isotopes and particularly of mixtures of such isotopes which also are composed of various degrees of substitution wherein the percent of isotopes and of mono-, di-, and poly-substituted material is sought to be determined is seldom of such accuracy that exactly 100% of the material being analyzed is fully accounted for. The above values are well within the permissible error acceptable for this type of compound which comprise a particularly difficult material for high precision analysis.
[2] The exact positions of the chloromethyl group on the benzene rings may vary among a number of para and ortho possibilities.

tween about 5 and 15 mm. of Hg pressure and at about 200° C. for about 0.5 hour and thereafter cooled. The reaction taking place may be represented by the equation below, wherein it is understood that the CH₂Cl substituent may be present on as many as five positions of either or both of the aryl groups:

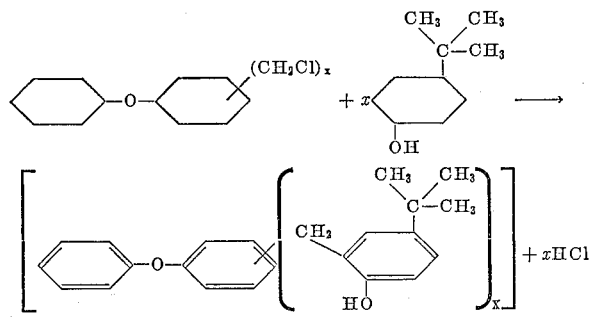

wherein $x$ is at least 1 and usually between 2 and 6. It is understood that the above group

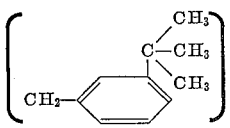

is present for each CH₂Cl group on either or both aromatic nuclei of the diphenyl oxide and that a polymer will result when two or more CH₂Cl groups are present and sufficient phenol is also present to react therewith. The adduct so produced is a thermoplastic type resin wherein $x$ is at least 1 and is usually between 2 and 6. The resin has a Durran's softening point of about 100–110° C. It is illustrative of the adduct of chloromethylated hydroxyl aromatic compound useful in the preparation of the resin of the invention.

The epoxy resin employed in the practice of the invention may be any one of the resins generally known by that name. They consist of epoxides having an average of more than one terminal vic-epoxy or oxirane group per molecule. They presently may be considered as of two general types: (1) epoxides prepared by reacting cyclic, acylic and alicyclic diolefins with an oxidizing agent such as $H_2O_2$ or a peracid such as peracetic acid to provide oxirane groups at olefinic double bonds and (2) glycidyl ethers prepared by reacting either a dihalohydrin or an epihalohydrin with either a polyhydric alcohol including glycols, polyglycols, glycerol, and pentaerythritol or a polyhydric phenol including bisphenols, resorcinol, phloroglucinol, phenol-formaldehyde novolacs, dihydric cresols, xylenols, and naphthols in the presence of a suitable catalyst and dehydrohalogenating agent. For example where a polyhydric alcohol is employed a Friedel-Crafts type catalyst such as $BF_3$ is usually employed as the catalyst and aqueous NaOH subsequently employed as the dehydrohalogenating agent. Where a polyhydric phenol is employed, aqueous NaOH is usually employed to serve both as the catalyst and dehydrohalogenating agent. Epoxy resins vary in molecular weight, in the average number of terminal oxirane groups per molecule (functionality), and in epoxide equivalent weight, i.e., the weight of resin in grams necessary to provide one oxirane gram molecule weight viz., 43. The equivalent weight and melting point increase with molecular weight.

The composition of the invention is prepared according to the following procedure:

The phenolic adduct and the epoxy resin are admixed in an inert organic solvent, e.g., acetone, at a temperature between about 20° and about 150° C., usually at room temperature or slightly above, in a suitable reaction vessel equipped with heat control and agitator means. The adduct is usually put into the reaction vessel and dissolved in the solvent prior to the addition of the epoxy resin. The molar ratio of epoxy resin to the phenolic adduct employed in the practice of the invention is between about 0.5 and about 1.5. The preferred molar ratio of the epoxy resin to the phenolic adduct is between about 0.75 and about 1.25 and the optimum ratio is between 1.0 and 1.2. The reaction product dissolved in the solvent is stable at this stage, at room temperature, for up to about four days. Just prior to using the product so dissolved, a base catalyst is admixed therewith. It is usually a tertiary amine, e.g., piperidine, benzyldimethylamine, dimethylaniline, triethylamine, tributylamine, dimethylaminoethanol, tridimethylaminomethylphenol, or N-methylmorpholine. The amine is usually employed in an amount of between about 0.1 and 1.0 percent by weight of the reaction mixture, about 0.5 percent being particularly recommended.

The product of the invention is advantageously employed as a laminating, coating, impregnating, or embedding composition, as made, without separation from the reaction medium. For example, the reaction may be carried out in a suitable elongated, somewhat shallow vessel or promptly transferred into such vessel, preferably held at a temperature of between about 10° and about 100° C. (but below the boiling point of the organic solvent employed), about room temperature usually being employed. The fabric or cloth to be impregnated or sheet to be laminated or coated is drawn therethrough or dipped therein to fill the interstices in the fabric and/or to coat the surfaces thereof to impregnate the sheets. They are thereafter dried. Drying is usually effected by passing the thus treated fabric or sheets through a forced air drier at a temperature and for a time sufficient to remove substantially all the organic solvent.

The dried impregnated sheets are then built into a multi-ply laminate of a desired size and cured at a temperature of between about 100° and about 210° C. for a period of time between about 15 minutes and 4 hours. The higher the curing temperature employed, the less curing time is necessary, within the above ranges. For example, a curing temperature and time of between about 140° C. and 160° C. and for between 2 and 2.5 hours has been found particularly satisfactory.

The laminates, coatings, and encapsulated or embedded articles so made possess excellent physical properties which impart long life thereto under a wide variety of gruelling conditions.

The examples below are illustrative of the practice of the invention. They represent specific combinations of reactants and specific set of conditions within the broad concept of the invention.

In carrying out the examples, the phenolic adduct was dissolved in acetone in an open vessel provided with a stirring and heating means. The epoxy resin, followed by 0.5 percent by weight of N-methyl morpholine was admixed therewith. Relatively large pieces of Volan 181 glass cloth, provided with a protective finish, e.g., a chromate finish which is designated Volan A or with a silane finish designated #136 were drawn slowly (about 2 feet per minute) through the body of acetone-dissolved resin at room temperature. The solvent was dried off at room temperature for several days. A satisfactory alternate drying procedure would have been to have flash dried the thus treated sheets for a lesser time, e.g., at 75° to 125° C. for from 2 to 15 minutes. The thus treated and dried sheets were then cut into convenient 7½" x 11" pieces. The pieces were then laid up according to standard "nesting" procedure to make 12-ply laminates, placed in temperature-controlled presses, 8" x 12" in size, and subjected to sufficient pressure to ensure the resin filling all of the interstices. The actual pressures employed were 10,000 p.s.i. but any pressure of at least about 130 p.s.i. is satisfactory. The percent by weight, of laminant (resin adhering to or impregnated in the laminae) was between 27% and 44%, dependent on a number of conditions such as the length of time the pieces of cloth were immersed in the liquid resin, the viscosity of the liquid resin, and the drying and curing conditions. The thickness of the cured laminated structure varied between about 0.11 and about 0.15 inch, usually being between 0.11 and 0.12 inch.

The specific adduct and epoxy resin, the molar ratio, and the curing temperature and time employed, the sample thickness and the physical properties ascertained thereon are set out in the ensuing table. In the table, the following designations have the meanings set out below:

CMDPO-28, -25, -32—Chloromethyldiphenyl oxide containing 28, 25, or 32 percent by weight chlorine.
E.E.W.—epoxide equivalent weight.
D.E.R. 331—diglycidyl ether (made by reacting bisphenol A and a molar excess of epichlorohydrin in the presence of aqueous NaOH) and having an epoxide equivalent weight of about 189.
D.E.R. 661—diglycidyl ether (made by reacting D.E.R. 331 and bisphenol A) and having an epoxide equivalent weight of about 525.
X 3442—diglycidyl ether (made by reacting tetrabromobisphenol A and a molar excess epichlorohydrin in the presence of aqueous NaOH) having an epoxide equivalent weight of about 325.
D.E.N. 438—an epoxy novolac (made by reacting a novolac and epichlorohydrin in the presence of aqueous NaOH) and having an epoxide equivalent weight of about 179.

wherein $n$ is 0 to 1, wherein at least one X is $CH_2Cl$ and the other X values are selected from the group consisting of H, $CH_2Cl$, Cl, Br, R and OR wherein R is alkyl of 1 to 4 carbon atoms and (2) an hydroxylated aromatic compound having the formula:

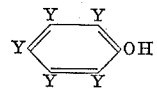

wherein Y is selected from the group consisting of H, Cl, Br, alkyl, aryl, aralkyl, and a hydroxyaryl, said alkyl containing from 1 to 10 carbon atoms and (B) an epoxy resin in a molar ratio of (B) to (A) of between about 0.5 and about 1.5 in the presence of a catalytic amount of a tertiary amine.

2. The composition of claim 1 wherein the molar ratio of (B) to (A) is between about 0.75 and 1.25.

3. The composition of claim 1 wherein (A) is the adduct of (1) chloromethylated diphenyl oxide and (2) an hydroxylated compound selected from the group consisting of phenol and alkylphenols in an amount sufficient to provide a molar excess of (2).

4. The composition of claim 3 wherein (A) is the adduct of (1) chloromethylated diphenyl oxide and (2) tertiary-butylphenol.

5. The composition of claim 3 wherein (A) is the adduct of (1) chloromethylated diphenyl oxide and (2) phenol.

6. The composition of claim 1 wherein epoxy resin

TABLE

| Example Number | Ingredients Employed | | | | Mole Ratio of Epoxy Resin to Phenolic Adduct | Curing Schedule | | Tensile [1] strength in p.s.i. | Physical Properties at room temperature | |
|---|---|---|---|---|---|---|---|---|---|---|
| | Epoxy Resin | | Phenolic Adduct | | | Time in min. | Temp. in °C. | | Izod [2] impact in ft. lb./in. | Flexural [3] strength in p.s.i. |
| | Type | Grams | Type | Grams | | | | | | |
| 1 | D.E.R. 331 | 216 | CMDPO-25 and t-butylphenol | 300 | 1.14/1 | 120 | 150 | [4] 56,400 | 14.84 | 68,200 |
| 2 | D.E.N. 438 | 212 | ...do... | 300 | 1.18/1 | 60 | 150 | [4] 38,000 | 9.93 | 48,000 |
| 3 | D.E.R. 661 | 315 | ...do... | 150 | 1.2/1 | 120 | 150 | 53,230 | 13.72 | 63,400 |
| 4 | X 3442 / D.E.R. 331 | 210 / 70 | ...do... | 240 | 1.2/1 | 120 | 150 | 43,000 | 15.69 | 87,500 |
| 5 | X 3442 / D.E.R. 661 | 185 / 97 | ...do... | 185 | 1.2/1 | 120 | 150 | 38,600 | 17.12 | 71,500 |
| 6 | D.E.R. 331 | 184 | CMDPO-28 and t-butylphenol | 304 | 1.0/1 | 120 | 150 | 40,300 | 13.62 | 62,700 |
| 7 | D.E.R. 661 | 226 | ...do... | 146 | 1.2/1 | 120 | 150 | 47,300 | 14.52 | 68,000 |
| 8 | D.E.R. 331 | 184 | CMDPO-32 and t-butylphenol | 217 | 1.0/1 | 120 | 150 | [5] 52,500 | 16.86 | 73,800 |
| 9 | D.E.R. 661 | 315 | CMDPO-32 and t-butylphenol | 109 | 1.2/1 | 120 | 150 | 47,800 | 14.25 | 77,000 |
| 10 | D.E.R. 331 | 212 | CMDPO-25 and Phenol | 208 | 1.12/1 | 120 | 150 | 59,400 | 14.34 | 67,500 |

[1] Run according to A.S.T.M. Test D 638-58T.
[2] Run according to A.S.T.M. Test D 256-56 (method A).
[3] Run according to A.S.T.M. Test D 790-49T.
[4] Percent elongation was run according to A.S.T.M. Test D 638-58T and found to be 5% for Example 1 and 4.7% for Example 2.
[5] The dielectric constant and dissipation factors were run on Example 8 according to A.S.T.M. Test D 150-54T. The frequency was varied from $1 \times 10\text{th}^3$ to $4.7 \times 10\text{th}^7$ and gave generally decreasing values ranging from 4.78 to 4.54 for the dielectric constant and gave generally increasing values from 0.0036 to 0.015 for the dissipation factor as the frequency was increased.

Reference to the physical properties set out on the table shows that high tensile strength, Izod notch impact, and flexural strength are attainable in accordance with the practice of the invention. They further show that the use of either tertiary butylphenol or phenol in the preparation of the phenolic adduct is clearly satisfactory; that chloromethyldiphenyl oxides containing 28, 25, or 32 percent chlorine are equally satisfactory; and that lower molecular weight epoxy resins, e.g., D.E.R. 331, higher molecular weight epoxy resins, e.g., 661, epoxy novolac resins, or mixture of epoxy resins as shown in Examples 4 and 5, are satisfactory in the practice of the invention.

Having described the invention, what is claimed and desired to be protected by Letters Patent is:

1. The resinous composition consisting essentially of the reaction product of (A) a phenolic adduct of (1) a chloromethylated aromatic compound having the formula:

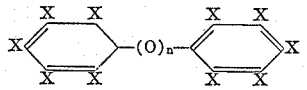

(B) is selected from the class consisting of the condensation product of epichlorohydrin and a polyhydric compound selected from the class consisting of glycols, glycerol, pentaerithrytol, resorcinol, hydroquinone, phloroglucinol, and bisphenols.

7. The composition of claim 6 wherein the bisphenol is bisphenol A.

8. The resinous composition of claim 1 wherein the catalytic amount of the tertiary amine employed is between 0.1 and 1.0 percent by weight of the composition.

References Cited by the Examiner

UNITED STATES PATENTS 2,615,008  10/1952  Greenlee _____ 260—47
2,986,550  5/1961   Davis et al. _____ 260—47
3,001,972  9/1961   Christenson et al. _____ 260—47

MURRAY TILLMAN, *Primary Examiner.*

LOUISE P. QUAST, *Examiner.*

P. H. HELLER, P. LIEBERMAN, *Assistant Examiners.*